US008950601B2

(12) United States Patent
Hagadorn et al.

(10) Patent No.: US 8,950,601 B2
(45) Date of Patent: Feb. 10, 2015

(54) PRESCRIPTION BOTTLE STORAGE UNITS AND MEDICAL ORGANIZER CASES

(76) Inventors: Colleen A. Hagadorn, Queensbury, NY (US); Kathleen A. Bauer, Brant Lake, NY (US)

( * ) Notice: Subject to any disclaimer, the term of this patent is extended or adjusted under 35 U.S.C. 154(b) by 0 days.

(21) Appl. No.: 13/021,297

(22) Filed: Feb. 4, 2011

(65) Prior Publication Data

US 2012/0200208 A1 Aug. 9, 2012

(51) Int. Cl.

| | |
|---|---|
| ***A47F 5/02*** | (2006.01) |
| ***A47F 3/14*** | (2006.01) |
| ***A47J 47/00*** | (2006.01) |
| ***A47B 67/02*** | (2006.01) |
| *A45C 13/02* | (2006.01) |
| *A61J 1/16* | (2006.01) |
| *A61J 7/04* | (2006.01) |

(52) U.S. Cl.

CPC ................. *A47B 67/02* (2013.01); *A45C 13/02* (2013.01); *A61J 1/16* (2013.01); *A61J 7/04* (2013.01)

USPC ........................................ 211/163; 211/131.1

(58) Field of Classification Search

CPC ................................... A47B 67/02; A61J 1/16

USPC ............. 211/10, 74, 75, 77, 85.18, 59.3, 163, 211/131.1; 220/559, 578, 810, 212.5; 206/438, 534, 538, 539, 570; 312/9.7, 312/9.8, 9.46, 125, 135, 234, 280, 249.2, 312/249.6, 283, 285, 290, 305

See application file for complete search history.

(56) References Cited

U.S. PATENT DOCUMENTS

| | | | | |
|---|---|---|---|---|
| 350,523 A | | 10/1886 | Bodley | |
| 503,306 A | * | 8/1893 | Bever | 312/249.4 |

(Continued)

FOREIGN PATENT DOCUMENTS

| | | |
|---|---|---|
| CN | 201160808 | 12/2008 |
| CN | 201316198 | 9/2009 |

(Continued)

OTHER PUBLICATIONS

Swivel Store® —Space Saving Organizer!, available from www.BuySwivelStore.com, 6—pages, at least as early as Nov. 18, 2010.

(Continued)

*Primary Examiner* — Joshua Rodden
*Assistant Examiner* — Kimberley S Wright
(74) *Attorney, Agent, or Firm* — Heslin Rothenberg Farley & Mesiti P.C.

(57) ABSTRACT

A prescription bottle storage unit for holding a plurality of prescription pill bottles, in one embodiment, includes a holder comprising a plurality of means for supporting the prescription pill bottles horizontally and spaced-apart around a vertically-extending axis of the holder and generally at right angles from the vertically-extending axis so that outer horizontal side portions of the prescription pill bottles are observable. Means for rotatably supporting the holder on a level surface is provided so that the plurality of means for supporting the prescription pill bottles is rotatable around the vertically-extending axis. In another embodiment, a portable device for prescription pill bottles includes a removable prescription bottle storage unit comprising a holder having a plurality of means for supporting the prescription pill bottles, and a medical organizer case comprising a compartment for receiving the removable prescription bottle storage unit therein.

34 Claims, 11 Drawing Sheets

(56) References Cited

U.S. PATENT DOCUMENTS

| | | | | | |
|---|---|---|---|---|---|
| 559,709 | A | * | 5/1896 | Hoff | 312/209 |
| 620,013 | A | * | 2/1899 | Barnes | 312/209 |
| 657,463 | A | * | 9/1900 | Simpson | 312/209 |
| 838,294 | A | * | 12/1906 | Zeiner | 211/58 |
| 872,942 | A | * | 12/1907 | Hutcheson et al. | 312/34.2 |
| 938,809 | A | * | 11/1909 | Alexander et al. | 211/40 |
| 954,793 | A | | 4/1910 | Graham | |
| 954,805 | A | * | 4/1910 | Hitchcock | 312/9.7 |
| 962,376 | A | | 6/1910 | Miller | |
| 970,522 | A | | 9/1910 | Lundstrom | |
| 1,154,815 | A | | 9/1915 | Solderberg | |
| 1,330,181 | A | * | 2/1920 | Gibbs | 312/329 |
| 1,412,664 | A | * | 4/1922 | May | 211/40 |
| 1,508,204 | A | | 9/1924 | Walker | |
| 1,581,749 | A | | 4/1926 | Mahony | |
| 1,678,357 | A | | 7/1928 | Sampson, Sr. | |
| 1,703,987 | A | * | 3/1929 | Butler | 211/74 |
| 1,732,131 | A | | 10/1929 | Mahaffey | |
| 1,963,544 | A | * | 6/1934 | Burt | 211/53 |
| 1,991,306 | A | | 2/1935 | Woolsey | |
| 2,008,335 | A | | 7/1935 | Nuyts | |
| 2,212,129 | A | * | 8/1940 | Rust | 221/289 |
| 2,305,958 | A | * | 12/1942 | Feick | 108/59 |
| 2,318,122 | A | * | 5/1943 | Williams | 220/475 |
| 2,545,844 | A | * | 3/1951 | Cougias | 211/43 |
| 2,600,770 | A | | 6/1952 | Hofacer | |
| 2,678,253 | A | * | 5/1954 | Rosenberg | 312/285 |
| 2,728,488 | A | | 12/1955 | Hankins | |
| 2,911,107 | A | * | 11/1959 | Francavillo | 211/78 |
| 2,936,897 | A | * | 5/1960 | Bloch | 211/85.1 |
| 3,028,014 | A | * | 4/1962 | Southwick | 211/59.3 |
| 3,225,913 | A | | 12/1965 | Lee | |
| 3,286,848 | A | * | 11/1966 | Galli | 211/85.18 |
| 3,378,134 | A | * | 4/1968 | Wilkinson et al. | 312/97.1 |
| 3,417,873 | A | * | 12/1968 | Leptrone | 211/77 |
| 3,862,787 | A | * | 1/1975 | Hilsinger | 312/285 |
| 3,889,817 | A | * | 6/1975 | Berkman | 211/163 |
| 3,942,647 | A | * | 3/1976 | Crosslen | 211/144 |
| 3,957,159 | A | * | 5/1976 | Radek | 211/4 |
| 4,079,841 | A | * | 3/1978 | Castel | 211/131.1 |
| D248,067 | S | * | 6/1978 | Leath | D6/461 |
| 4,118,002 | A | * | 10/1978 | Bartlett | 248/311.2 |
| 4,126,366 | A | * | 11/1978 | Handler et al. | 312/249.2 |
| 4,140,223 | A | * | 2/1979 | Rau et al. | 211/78 |
| 4,204,602 | A | * | 5/1980 | Dunchock | 211/85.1 |
| 4,210,186 | A | * | 7/1980 | Belenson | 206/316.2 |
| 4,300,809 | A | * | 11/1981 | Brownlee | 312/305 |
| 4,327,836 | A | * | 5/1982 | Okuno | 211/74 |
| 4,334,617 | A | * | 6/1982 | Rossmo | 206/534 |
| 4,339,164 | A | * | 7/1982 | Spevak | 312/283 |
| D267,847 | S | * | 2/1983 | Pielert | D7/707 |
| 4,422,555 | A | | 12/1983 | Jacobs | |
| 4,453,640 | A | * | 6/1984 | Cillario | 211/133.4 |
| 4,523,702 | A | | 6/1985 | Viio | |
| 4,541,540 | A | | 9/1985 | Gretz et al. | |
| 4,550,828 | A | * | 11/1985 | Baldwin et al. | 206/349 |
| 4,560,072 | A | * | 12/1985 | Burrell | 211/75 |
| 4,609,975 | A | * | 9/1986 | Badolato et al. | 362/125 |
| D291,637 | S | * | 9/1987 | Burin | D7/600.3 |
| 4,697,856 | A | * | 10/1987 | Abraham | 312/305 |
| 4,700,829 | A | | 10/1987 | Goodyear | |
| 4,700,850 | A | * | 10/1987 | Morgan et al. | 211/131.1 |
| 4,738,038 | A | * | 4/1988 | Tanne et al. | 40/506 |
| 4,753,340 | A | * | 6/1988 | Blakeman et al. | 206/459.5 |
| 4,770,314 | A | * | 9/1988 | Giesler | 220/544 |
| 4,796,960 | A | | 1/1989 | Candelas | |
| 4,819,815 | A | | 4/1989 | Tarlow et al. | |
| 4,850,658 | A | * | 7/1989 | Sandor | 312/225 |
| D302,908 | S | * | 8/1989 | Hwang | D6/397 |
| 4,875,744 | A | * | 10/1989 | Wettstein | 312/244 |
| 4,884,713 | A | * | 12/1989 | Handler | 220/23.4 |
| 4,944,924 | A | * | 7/1990 | Mawhirt et al. | 422/562 |
| 4,962,860 | A | * | 10/1990 | Lehmann | 211/88.01 |
| 4,999,943 | A | * | 3/1991 | Crabtree | 43/54.1 |
| D320,141 | S | | 9/1991 | Farrell | |
| D324,141 | S | * | 2/1992 | Wu | D6/457 |
| 5,105,919 | A | | 4/1992 | Bomes et al. | |
| D327,820 | S | | 7/1992 | Ancona et al. | |
| 5,158,345 | A | * | 10/1992 | Baur | 312/9.46 |
| 5,160,101 | A | | 11/1992 | Ferraro et al. | |
| 5,183,165 | A | | 2/1993 | Acona et al. | |
| D334,510 | S | | 4/1993 | Ancona et al. | |
| D334,873 | S | | 4/1993 | Ancona et al. | |
| 5,255,801 | A | * | 10/1993 | Berger | 211/131.1 |
| 5,286,103 | A | * | 2/1994 | Price et al. | 312/9.46 |
| 5,289,940 | A | * | 3/1994 | Wisenbaugh | 220/507 |
| D347,769 | S | | 6/1994 | Kibbe | |
| D348,364 | S | * | 7/1994 | Engel | D6/457 |
| 5,333,745 | A | * | 8/1994 | Lehmann | 211/88.01 |
| 5,335,985 | A | * | 8/1994 | Baur | 312/9.31 |
| 5,346,079 | A | * | 9/1994 | Price et al. | 211/41.12 |
| 5,390,791 | A | | 2/1995 | Yeager | |
| 5,405,193 | A | * | 4/1995 | Herrenbruck | 312/118 |
| 5,564,578 | A | * | 10/1996 | Smith | 211/133.1 |
| 5,622,010 | A | * | 4/1997 | Weber | 52/36.4 |
| 5,678,908 | A | * | 10/1997 | Wang | 312/264 |
| D394,575 | S | | 5/1998 | Mikloczak et al. | |
| 5,772,054 | A | * | 6/1998 | Potter | 211/87.01 |
| D401,483 | S | | 11/1998 | Porcelli | |
| 5,855,281 | A | * | 1/1999 | Rabas | 211/59.3 |
| D413,491 | S | | 9/1999 | McCauley | |
| D426,062 | S | * | 6/2000 | Shui-Shang | D3/315 |
| 6,179,102 | B1 | * | 1/2001 | Weber et al. | 190/109 |
| 6,182,839 | B1 | * | 2/2001 | Robbins et al. | 211/78 |
| 6,189,710 | B1 | * | 2/2001 | Mason | 211/131.1 |
| 6,206,493 | B1 | * | 3/2001 | Sanchez-Levin et al. | 312/125 |
| 6,401,993 | B1 | | 6/2002 | Andrino | |
| 6,439,406 | B1 | * | 8/2002 | Duhon | 211/131.1 |
| 6,464,506 | B1 | | 10/2002 | Welles | |
| 6,502,707 | B1 | * | 1/2003 | Sullivan | 211/163 |
| 6,595,375 | B2 | * | 7/2003 | McConnell | 211/70.6 |
| 6,752,281 | B1 | * | 6/2004 | Mason et al. | 211/195 |
| 6,761,266 | B2 | | 7/2004 | Popish | |
| 6,808,077 | B2 | * | 10/2004 | McConnell | 211/70.6 |
| D498,982 | S | | 11/2004 | Hockey | |
| 6,910,748 | B1 | * | 6/2005 | Fountain | 312/135 |
| 6,935,133 | B2 | | 8/2005 | Keeter et al. | |
| 6,955,268 | B2 | * | 10/2005 | Waldron | 211/51 |
| 6,994,194 | B2 | * | 2/2006 | Smith | 190/111 |
| D526,533 | S | | 8/2006 | Burnett et al. | |
| 7,111,733 | B1 | | 9/2006 | Foote | |
| D535,475 | S | | 1/2007 | Delafontaine | |
| 7,229,143 | B2 | * | 6/2007 | Gilman | 312/405.1 |
| 7,234,254 | B2 | | 6/2007 | Schmidt | |
| 7,275,647 | B1 | * | 10/2007 | Thompson | 211/85.18 |
| D561,539 | S | | 2/2008 | Snider et al. | |
| 7,533,776 | B2 | * | 5/2009 | Nickerson | 211/94.01 |
| 7,565,979 | B1 | | 7/2009 | Gibson | |
| 7,568,582 | B1 | * | 8/2009 | Berger | 211/74 |
| 7,571,811 | B2 | * | 8/2009 | Mulaw | 206/535 |
| 7,584,849 | B2 | | 9/2009 | Mauk | |
| 7,607,541 | B2 | | 10/2009 | Girgis et al. | |
| 7,789,473 | B2 | * | 9/2010 | Loewen | 312/283 |
| 7,926,661 | B2 | | 4/2011 | Beeman | |
| 8,006,846 | B2 | * | 8/2011 | Robertson | 206/570 |
| 8,127,943 | B2 | * | 3/2012 | Takashima et al. | 211/59.3 |
| 8,292,096 | B2 | * | 10/2012 | Thompson | 211/77 |
| 8,302,787 | B2 | * | 11/2012 | Tobey et al. | 211/77 |
| 8,511,487 | B2 | * | 8/2013 | Andersen et al. | 211/144 |
| 8,534,472 | B2 | * | 9/2013 | Levine et al. | 211/163 |
| 8,640,891 | B2 | * | 2/2014 | Buttigieg | 211/131.1 |
| 2003/0173361 | A1 | | 9/2003 | Lee | |
| 2004/0168954 | A1 | | 9/2004 | Hannan et al. | |
| 2005/0121121 | A1 | * | 6/2005 | Wang | 150/117 |
| 2006/0070901 | A1 | * | 4/2006 | Adams et al. | 206/373 |
| 2006/0207950 | A1 | * | 9/2006 | Kiehnau et al. | 211/59.2 |
| 2007/0056916 | A1 | * | 3/2007 | Marano | 211/10 |
| 2007/0084742 | A1 | | 4/2007 | Miller et al. | |
| 2007/0119806 | A1 | * | 5/2007 | Le Sech | 211/133.1 |
| 2007/0262683 | A1 | * | 11/2007 | Creed | 312/290 |
| 2008/0093254 | A1 | | 4/2008 | Girgis et al. | |
| 2008/0121554 | A1 | * | 5/2008 | Townsend | 206/570 |
| 2009/0010575 | A1 | | 1/2009 | Sanka | |
| 2009/0152159 | A1 | | 6/2009 | Beeman | |

(56) References Cited

U.S. PATENT DOCUMENTS

| | | | | |
|---|---|---|---|---|
| 2009/0223915 | A1* | 9/2009 | Thompson | 211/85.3 |
| 2010/0059560 | A1* | 3/2010 | Lanum | 224/257 |
| 2010/0071395 | A1* | 3/2010 | Ledoux et al. | 62/259.1 |
| 2010/0230368 | A1* | 9/2010 | Slade | 211/33 |
| 2011/0017624 | A1 | 1/2011 | Robertson | |
| 2011/0031199 | A1 | 2/2011 | Tobey et al. | |
| 2011/0062094 | A1* | 3/2011 | Levine et al. | 211/58 |
| 2011/0121697 | A1 | 5/2011 | Greiner | |
| 2012/0195525 | A1* | 8/2012 | Sabounjian | 383/38 |
| 2013/0220850 | A1 | 8/2013 | Wingate, III | |
| 2013/0228408 | A1* | 9/2013 | Lease et al. | 190/18 A |
| 2013/0233741 | A1 | 9/2013 | Caruth | |
| 2014/0014603 | A1* | 1/2014 | Thompson | 211/78 |

FOREIGN PATENT DOCUMENTS

| | | |
|---|---|---|
| FR | 2583389 | 12/1986 |
| GB | 2249262 | 5/1992 |
| GB | 2448156 | 10/2008 |
| SE | 514112 | 1/2001 |

OTHER PUBLICATIONS

SpiceStack 18—Bottle Flip-Down Cabinet Organizer, available from QVC, West Chester, Pennsylvania and online at QVC.com, 7—pages, at least as early as Feb. 25, 2009.

MedValet Medications Organizer, available from CoKel LLC, Arlington Heights, IL, 2—pages, at least as early as Sep. 18, 2006.

Hagadorn et al., U.S. Appl. No. 13/365,894, filed Feb. 3, 2012, entitled “Prescription Bottle Storage Units and Medical Organizer Cases”, 36—pages.

Tabletop Spinning Cosmetic Organizer, by Lori Greiner, available from QVC, West Chester, Pennsylvania, printout available online on Jan. 23, 2013, at http://www.qvc.com/Tabletop-Spinning-Cosmetic-Organizer-by-Lori-Greiner. product.H164200.html, 2—pages, Dec. 8, 2009.

Hagadorn et al., U.S. Appl. No. 13/804,385, filed Mar. 14, 2013.

* cited by examiner

PRESCRIPTION BOTTLE STORAGE UNITS AND MEDICAL ORGANIZER CASES

FIELD OF THE INVENTION

This invention relates generally to holders for prescription pill bottles, and more specifically, to prescription pill bottle holder and medical organizer cases therefor.

BACKGROUND OF THE INVENTION

U.S. Patent Application Publication No. 2009/0010575 by Sanka discloses a bag that holds pill-organizers within, which together serve as a rolodex of pill organizers, and accommodates several pill organizers that are commercially available in the market in an orderly and secure manner. The bag of pill organizers can be easily carried in one's hand or on the shoulder with a shoulder-strap while on a visit to the doctor or medical professional for a visual examination of pills not yet consumed and any changes in medication. The bag can also be carried as a travel accessory during a user's trip such as on a cruise, and can have various ornamental designs to serve as identifiers and to cater to the preferences of users. The bag fills the need for a simple tool to organize pills and remove the pain of taking pills even while traveling. A round organizer is illustrated in FIG. 8 of Sanka.

U.S. Pat. No. 7,111,733 issued to Foote discloses a prescription pill container organizer and carrier which includes one or more rows of elastic loop holders attached to the inside of a piece of flexible material in which are held prescription pill containers, the piece folded or rolled up to enclose the prescription pill containers. Pockets for documents and a tethered magnifier for reading the prescription pill container labels are also installed next to the rows of holders.

U.S. Pat. No. 6,464,506 issued to Welles discloses a medication compliance organizer having a magnetized panel that may be conveniently mounted on the front of an appliance such as a refrigerator, or alternatively conventionally hung on a wall or other suitable surface. The organizer includes a plurality of day and time based containers for organizing and releasably holding the medications, typically four vials in vertical columns for each day of the week, one for each prescription time interval, i.e. morning, noon, evening and bedtime. The individual containers are sufficiently large to handle the varying medication formats from tablets, elixirs and patches. The organizer further includes an open tray for holding other medications and peripheral supplies, a reminder area for writing reminders regarding specific medications or activities, and medical forms for reference by the patient, care givers and health care personnel.

U.S. Pat. No. D334,873 issued to Ancona et al. discloses a spice rack which supports a spice container along the length of the container.

U.S. Pat. No. D347,769 issued to Kibbe discloses a combined revolving spice rack and spice grinder container.

Chinese Application Publication No. 201160808 discloses an integral condiment frame which comprises a bracket with support legs. More than two spice vessels are symmetrically and fixedly arranged at the lateral part of the bracket.

U.S. Pat. No. D535,475 issued to Delafontaine discloses a hand bag having an upper opening and side pockets.

U.S. Pat. No. 1,154,815 issued to Soderberg disclosures a vise employing a movable pawl, U.S. Pat. No. 962,376 issued to Miller discloses a door holder employing a plate having a slot and stops attachable to the plate with nuts and bolts, U.S. Pat. No. 970,522 issued to Lundstrom discloses a locking device for follower blocks, and U.S. Pat. No. 1,678,357 issued to Sampson discloses a locking means for index cards and the like.

There is a need for further holders for prescription pill bottles, and more specifically, to prescription pill bottle holders and medical organizer cases therefor.

SUMMARY OF THE INVENTION

In a first aspect, the present invention provides a prescription bottle storage unit for holding a plurality of prescription pill bottles. The prescription bottle storage unit comprises a holder comprising a plurality of means for supporting the plurality of prescription pill bottles disposed horizontally and spaced-apart around a vertically-extending axis of the holder and generally at right angles from the vertically-extending axis so that outer horizontal side portions of the plurality of prescription pill bottles are observable. Means for rotatably supporting the holder on a level surface is provided so that the plurality of means for supporting the plurality of prescription pill bottles is rotatable around the vertically-extending axis.

In a second aspect, the present invention provides a portable device for a plurality of prescription pill bottles. The device includes a removable prescription bottle storage unit for supporting the prescription pill bottles, and a medical organizer case comprising a compartment for receiving the prescription bottle storage unit therein.

In a third aspect, the present invention provides a method for organizing a plurality of prescription pill bottles. The method includes providing a holder comprising a plurality of supports for horizontally supporting the plurality of prescription pill bottles spaced-apart around a vertically-extending axis of the holder and generally at right angles from the vertical axis, and supporting the plurality of prescription pill bottles on the plurality of supports so that outwardly-extending side portions of the plurality of prescription pill bottles are observable.

BRIEF DESCRIPTION OF THE DRAWINGS

The subject matter which is regarded as the invention is particularly pointed out and distinctly claimed in the concluding portion of the specification. The invention, however, may best be understood by reference to the following detailed description of various embodiments and the accompanying drawings in which:

DETAILED DESCRIPTION OF THE INVENTION

In one aspect, the present invention is directed to portable prescription bottle storage units and medical organizer cases. For example, in a prescription bottle storage unit, a plurality of prescription bottles may lie horizontally so that a person can easily read a label on a side of the bottle identifying the type of medication in the bottle. The medical organizer case may provide organization and a place for vital medical information and other medical items in one convenient location. In addition, the prescription bottle storage unit may be placed in the medical organizer case. Advantageously, a person may take the unit and case with him or her to a hospital in case of an emergency, to a doctor visit, or on vacation, etc. and have all the necessary medication and information available for proper medical treatments, as well as reduce the likelihood of inadvertent medication mix-ups.

Figure 1:
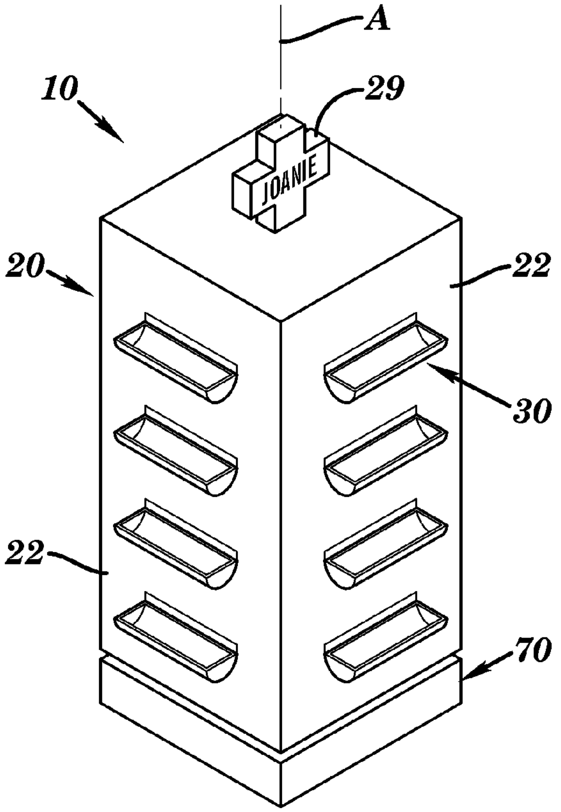
FIG. 1 is a perspective view of an embodiment of a prescription bottle storage unit in accordance with an aspect of the present invention.
Figure 2:
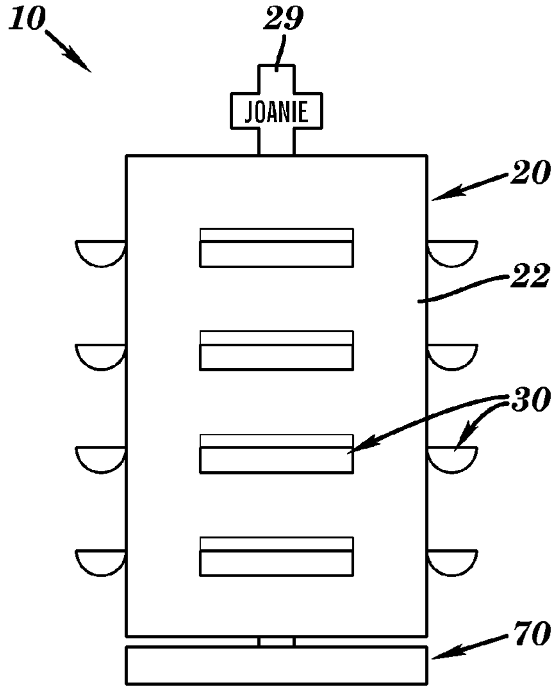
FIG. 2 is a side elevational view of the prescription bottle storage unit of FIG. 1.

FIGS. 1 and 2 illustrate one embodiment of a prescription bottle storage unit 10 in accordance with an aspect of the present invention for holding a plurality of prescription pill bottles (not shown in FIGS. 1 and 2). Prescription bottle storage unit 10 may include a holder 20 and a stand or means 70 for rotatably supporting the holder on a level surface such as a table or a counter.

Figure 3:
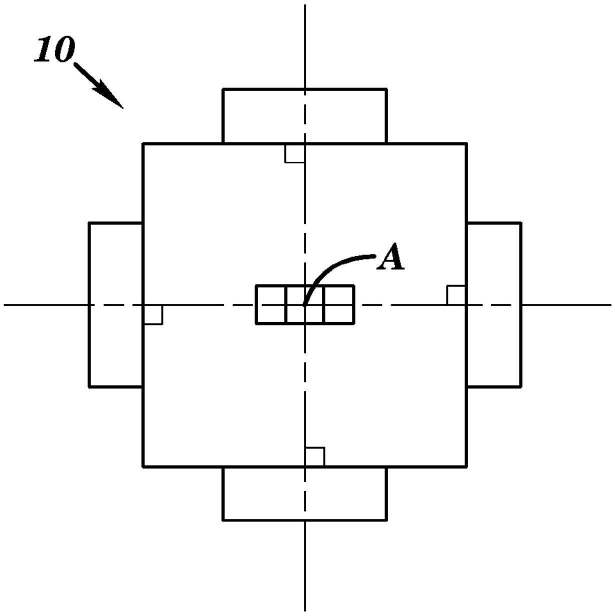
FIG. 3 is a top view of the prescription bottle storage unit of FIG. 1.

Holder 20 may include a plurality of sides 22 having a plurality of means or supports 30 disposed thereon for holding and supporting a plurality of prescription pill bottles (not shown in FIGS. 1 and 2). For example, when viewing the holder from above as shown in FIG. 3, the supports may be disposed thereon generally orthogonally and at a right angle from a central vertically-extending axis A of the holder for horizontally supporting the plurality of prescription pill bottles and operable for viewing an outwardly-extending horizontal side portions of the prescription pill bottles. In one embodiment, the holder may include four vertically-extending planar sides and a plurality of generally horizontally disposed supports attached to the four sides. The planar sides may be disposed at ninety-degrees from each other. Each side may include four supports for a total of sixteen supports for holding sixteen prescription pill bottles.

Figure 4:
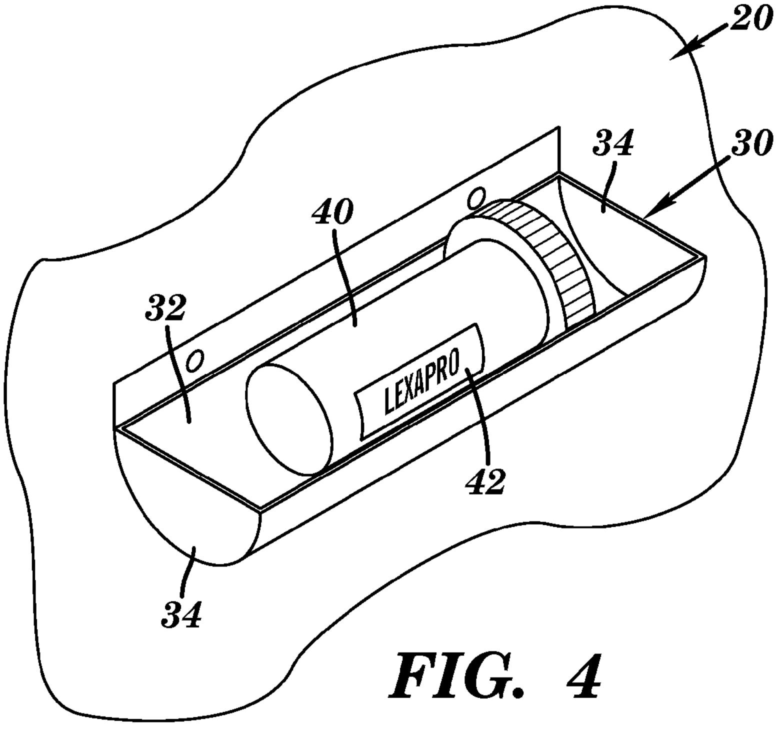
FIG. 4 is an enlarged perspective view of one of the supports of FIG. 1 for holding a prescription pill bottle.

Supports 30 may be crescent shaped or have a curved surface for receiving and supporting the prescription pill bottles. As best shown in FIG. 4, one embodiment of support 30 may include a curved support or surface 32 for supporting a prescription pill bottle 40. The ends of the holder may be closed, e.g., provided with stops 34 for restraining or inhibiting movement of the pill bottle along its length and maintain the pill bottle on the holder. A label 42 having indicia such as the name of the prescription pill contained in the bottle may be placed along the side of the bottle to allow a user to readily identify the bottle.

Figure 5:
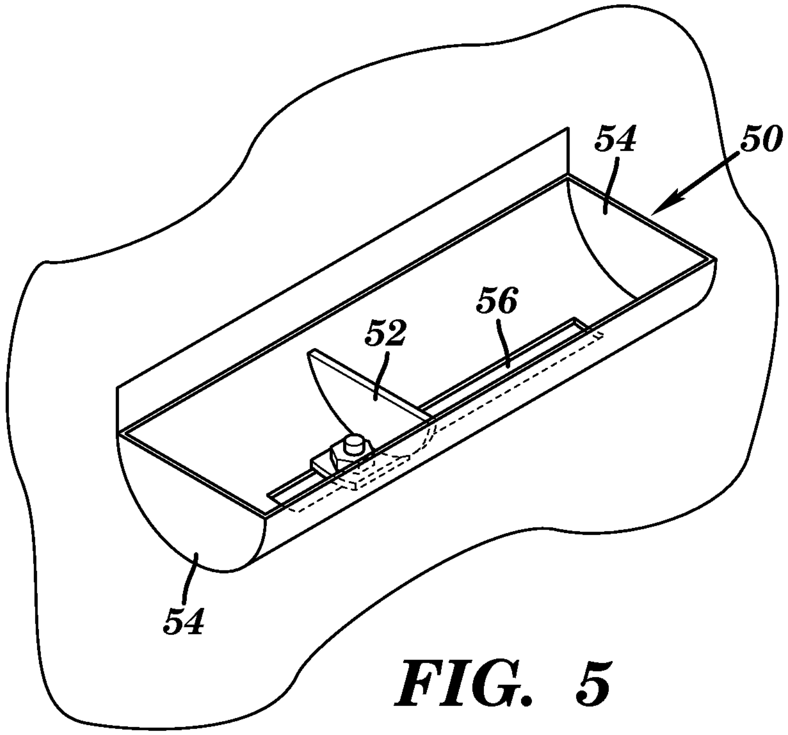
FIG. 5 is a perspective view of another embodiment of a support in accordance with an aspect of the present invention for holding a prescription pill bottle.
Figure 6:
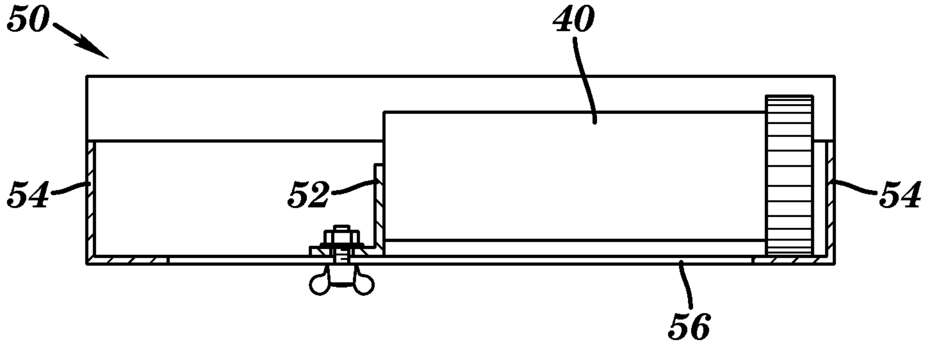
FIG. 6 is a cross-sectional view of the support of FIG. 5.

FIGS. 5 and 6 illustrate another embodiment of a support 50 having an adjustable movable stop 52 for adjustably engaging one of the ends of a prescription pill bottle 40 (FIG. 6). For example, an elongated bolt and wing nut may be operably disposed in a slot 56 to allow a user to clamp and secure prescription pill bottle 40 between adjustable movable stop 52 and fixed stop 54.

Figure 7:
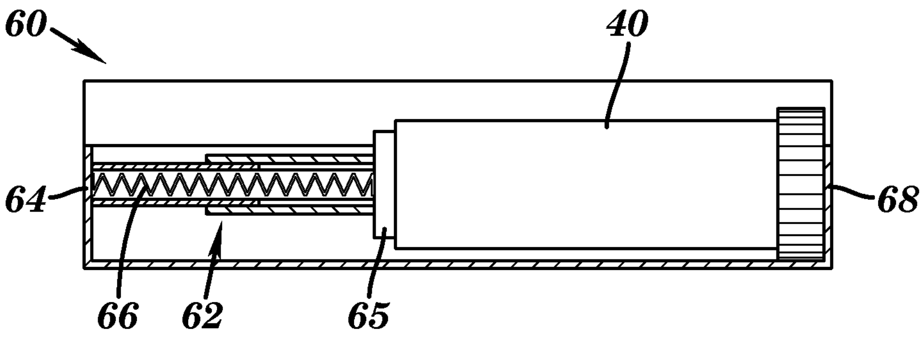
FIG. 7 is a cross-sectional view of another embodiment of a support in accordance with an aspect of the present invention for holding a prescription pill bottle.

FIG. 7 illustrates another embodiment of a support 60 having a biased adjustable movable stop 62 for adjustably biasing one of the ends of the prescription pill bottle. For example, a stop 65 and a spring 66 may be operably employed to allow a user to readily secure prescription pill bottle 40 between stop 65 and stop 68. In one embodiment, the spring may be disposed and contained in telescoping portions which extend between end 64 and stop 65. In another embodiment, the support may include notches which cooperate with a sliding member having a portion which locks into the notches. From the present description, other suitable means for releasably clamping and inhibiting movement of the prescription pill bottles on the supports may be employed.

Figure 8:
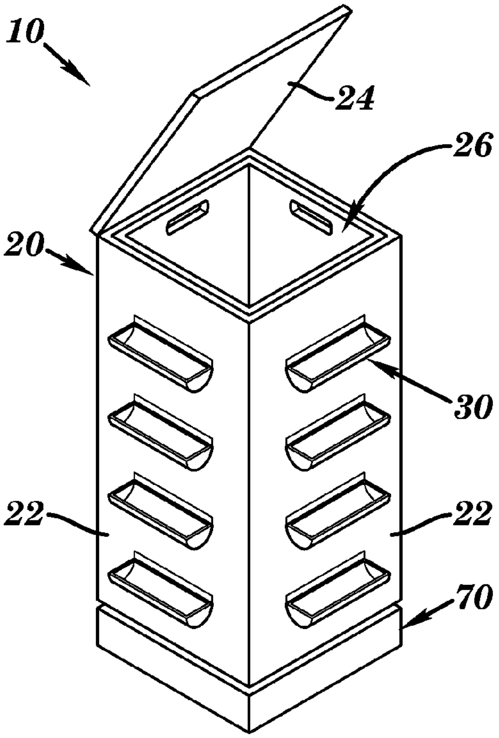
FIG. 8 is a perspective view of the prescription bottle storage unit of FIG. 1 illustrating a lid or top in an open position and showing a chamber therein.

With reference to FIG. 8, prescription bottle storage unit 10 may include a top or cover 24 which may be raised to expose a chamber 26 disposed in and formed by sides 22 of holder 20. Cover 24 may be suitably hinged along one edge to a top edge of one of sides 22. An opposite side edge of cover 24 may be provided with a suitable lock for releasably securing cover 24 to a top edge of side 22 and covering chamber 26.

Figure 9:
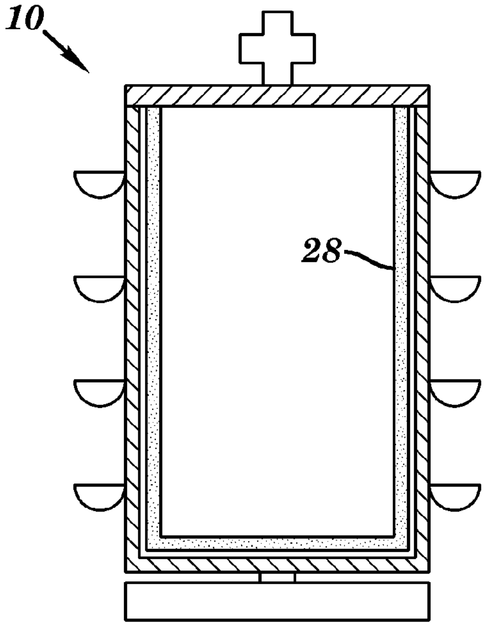
FIG. 9 is a cross-sectional view of the prescription bottle storage unit of FIG. 8 illustrating the chamber therein.

As shown in FIG. 9, disposed in the chamber of the holder may be a removable plastic insulated liner or container 28 to prevent leakage of, for example ice packs, and to provide easy access to items that may be stored in the chamber. For example, insulin may be easily stored in the insulated container along with the ice pack. Other items such as a diabetes case and accessories could also be stored in the central core area as well.

With reference again to FIG. 1, a handle 29 may be disposed along an upper portion of the prescription bottle storage unit for lifting the prescription bottle storage unit. In one embodiment, the handle may have a medical cross-shaped configuration and may include the name of the person corresponding to the prescription pill bottles held in the holder. In addition, the handle may be used to rotate the holder. From the present description, any other handles and shapes may be suitably employed. For example, a strap such as a fabric strap may be employed. A person's name may be disposed or woven into the fabric strap.

In addition, rotatable stand 70 or means for rotating the holder may be disposed along the bottom of the holder. The rotatable stand may be supportable on a level or horizontal surface such as a table or counter so that the holder is rotatable a full 360 degrees. The rotatable stand may include any suitable rotating or pivoting member.

Figure 10:
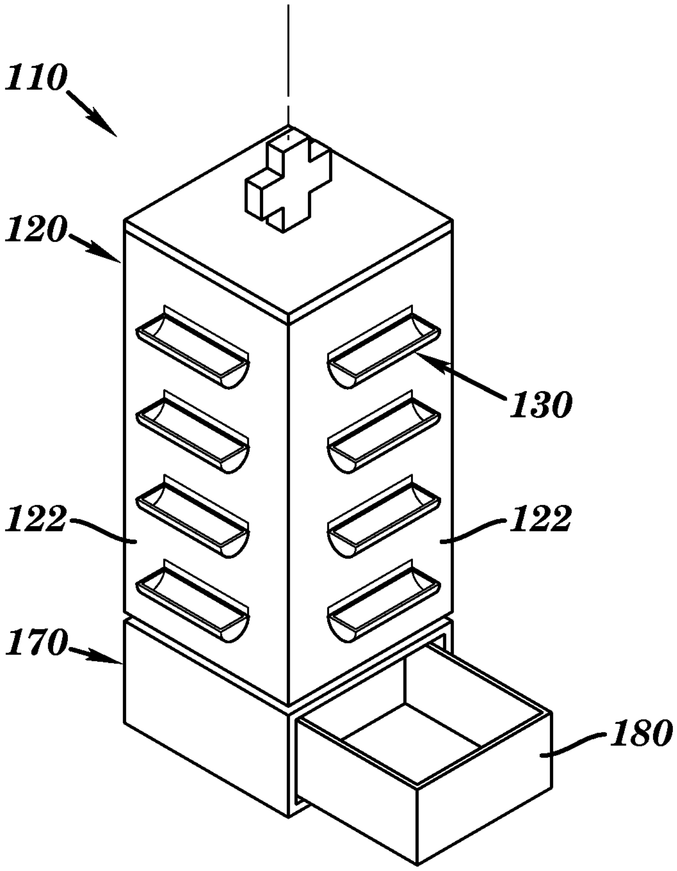
FIG. 10 is a perspective view of another embodiment of a prescription bottle storage unit in accordance with an aspect of the present invention having a drawer.
Figure 11:
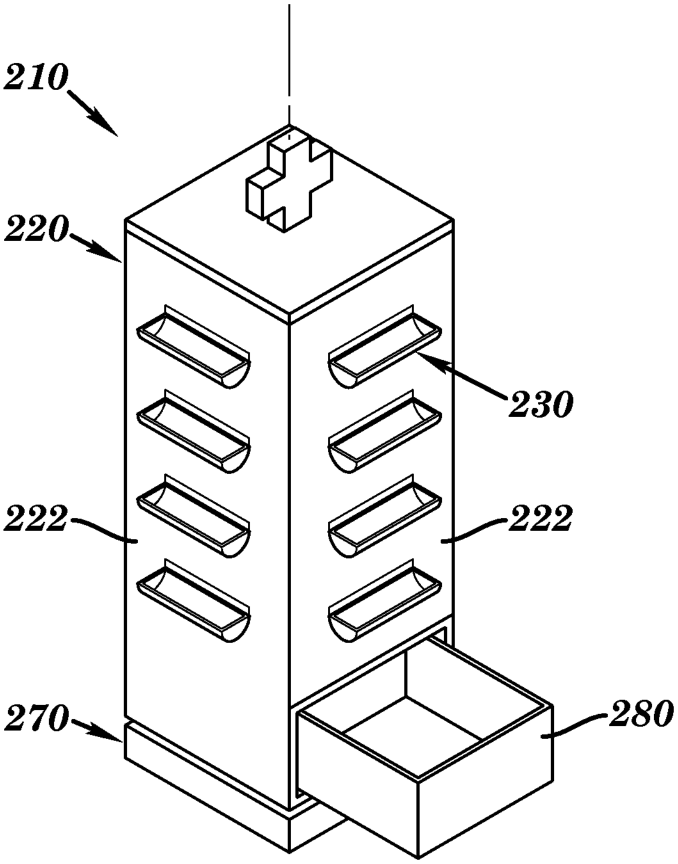
FIG. 11 is a perspective view of another embodiment of a prescription bottle storage unit in accordance with an aspect of the present invention having a drawer.

In another aspect of the present invention, as shown in FIG. 10, a prescription bottle storage unit 110 may include a movable pull out drawer 180 which may be incorporated into the stand. In another aspect of the present invention, as shown in FIG. 11, a prescription bottle storage unit 210 may include a movable pull out drawer 280 which may be incorporated into the sides of the holder. The pull-out drawer section may allow for storage of weekly/monthly pill dispensers and/or other items such as magnifying lenses, eye glasses, etc. The front of the drawer may have a handle such as a recessed handle or an opening to allow a user to easily open the drawer. It is appreciated that other suitable handles may be employed.

From the present description, it will be appreciated that the sides of the holder may have more or less than four sides for holding the prescriptions pill bottles, and the sides may be assembled from separate pieces, or may be formed as an integral monolithic structure. In addition, the sides need not be solid but can have openings therethrough. Further, the holder may have any suitable shape and configuration for holding the prescription pill bottles as described above. The supports may include a curved bottom surface or other surface such as angled surfaces for supporting typically cylindrical or square prescription pill bottles. Further, other structured and disposed supports may be employed which horizontally support the prescription pill bottles on the holder. For example, an elastic strap or a pair of elastic straps may be employed for horizontally supporting a prescription pill bottle on the holder while allowing a user to observe and read a label disposed on an outwardly-extending side portion of the prescription pill bottle.

Figure 12:
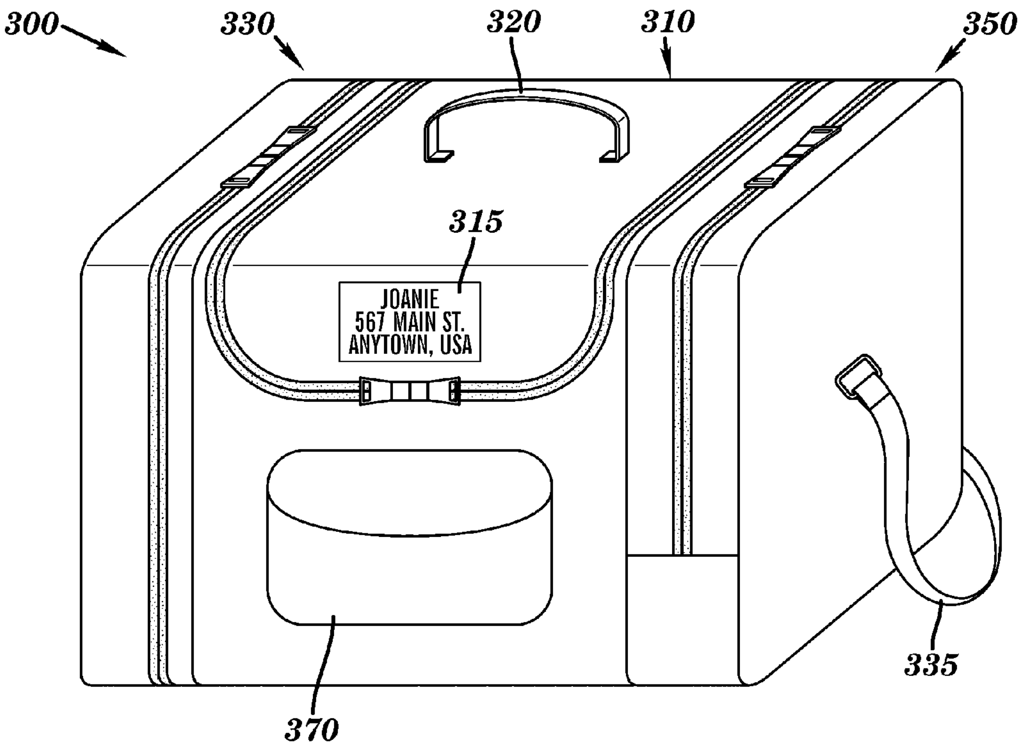
FIG. 12 is a perspective view of an embodiment of a medical organizer case in accordance with an aspect of the present invention.
Figure 13:
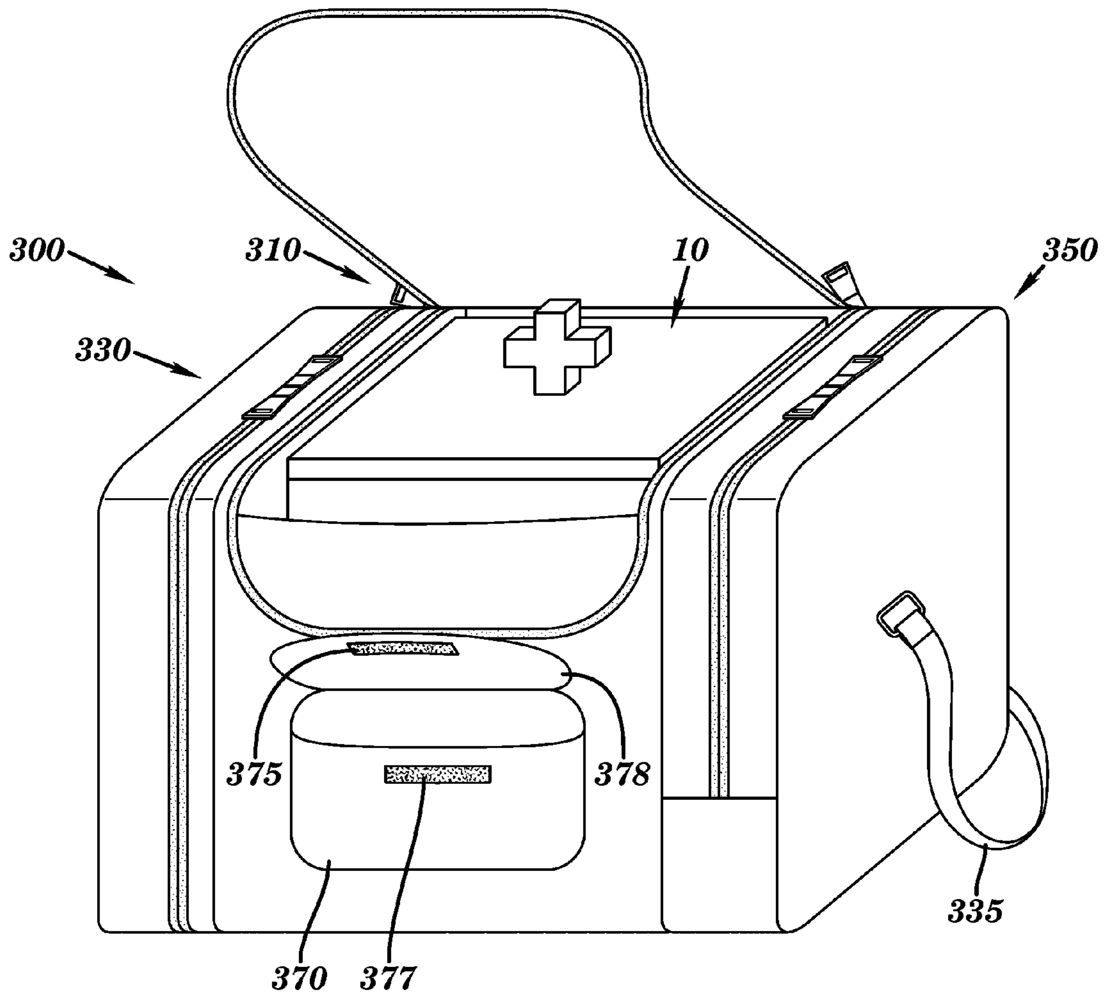
FIG. 13 is a perspective view of the medical organizer case of FIG. 12 with the flap of the center compartment opened showing the prescription bottle storage unit of FIG. 1 therein.
Figure 14:
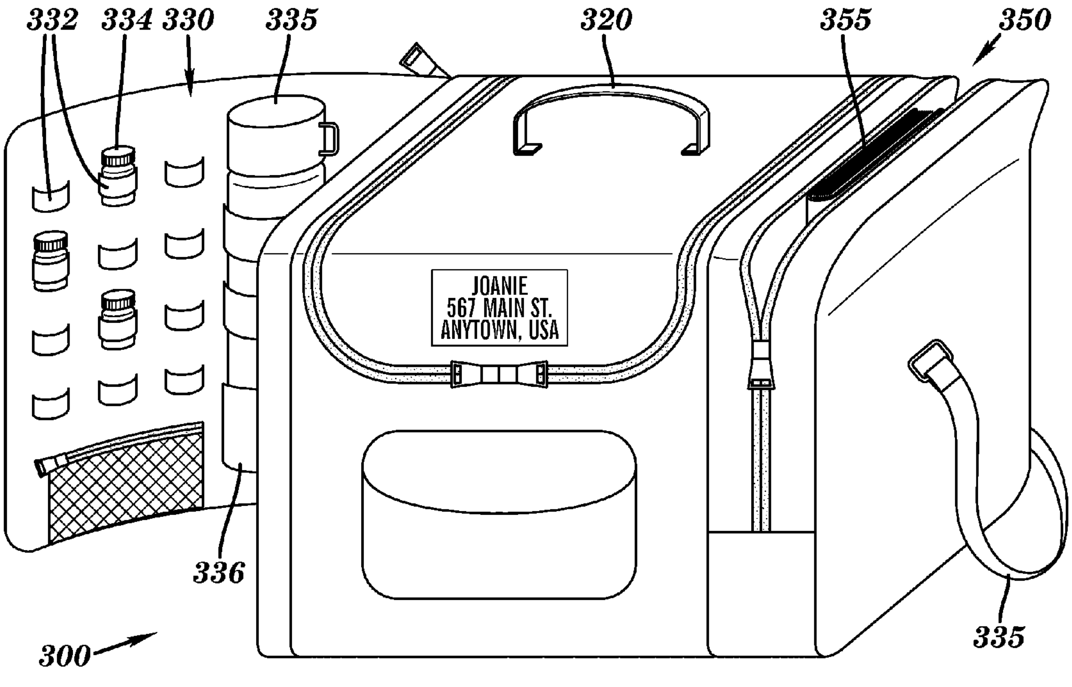
FIG. 14 is a perspective view of the medical organizer case of FIG. 12 with the flaps of the left-hand side compartment and the right-hand side compartment opened.

FIGS. 12-14 illustrate one embodiment of a medical organizer case 300 in accordance with an aspect of the present invention. Generally, the medical organizer case may include a center compartment 310, a left-hand side compartment 330, a right-hand side compartment 350, and a front pouch 370. The various compartments may include a zipper for operably opening and closing the compartments. A handle 320 may be disposed along the top of the center compartment. A shoulder strap 335 may also be provided in which the ends of the strap are attached to the side compartments.

As best shown in FIG. 13, center compartment 310 of medical organizer case 300 defines a chamber for receiving and storing prescription bottle storage unit 10 therein such as when transporting the prescription bottle storage unit. Center compartment 310 is sized and configured for receiving and tightly surrounding and fitting around prescription bottle storage unit 10 so that the prescription bottle storage unit does not move around or topple over and to inhibit the pill bottles from disengaging from the supports when contained in the center compartment, for example, during transport. Front pouch 370 may be disposed on the front of the center compartment and include a flap 378. The front pouch may hold a personal calendar for appointments, a small cardstock card for frequently called numbers (doctors, family members, pharmacies and Rx refill numbers), and a small business card holder (box) for appointment cards and/or health insurance card, etc. Hook-and-loop fasteners 375 and 377 may be employed for releasably closing flap 378.

With reference to FIG. 14, the right-hand side compartment 350 may hold a medical binder 355 and/or other items.

With reference still to FIG. 14, the left-hand side compartment 330 may open to the side and may include a plurality of elastic straps 332 located therein for holding, for example, prescription pill bottles 334, and a water bottle 335 with a built-in cup to put pills in before taking with a drink from the cup. Netting 336 and/or elastic straps may be used for loose items and other pill bottles (liquid), etc., that do not fit into storage unit. The left-hand side compartment may also be large enough for receiving and holding other medical supplies.

With reference again to FIG. 12, the medical organizer case may also include a sewn in pouch 315 with plastic covering for name tag and address.

A decorative cover may be provided for the prescription bottle storage unit when the prescription bottle storage unit is disposed on a counter at a home. A pill checklist for use when filling monthly/weekly pill dispenser which may be easily wiped-off when medications change may also be included.

In addition, each side compartment may be detachable. For example, if a person didn't want to take the binder or the right-hand side compartment he/she could just remove that compartment and carry the other two. The cases may be attachable with, for examples, hook-and-loop fasteners or suitable releasable locking means. Each removable compartment may have a separate carrying handle or a built-in handle. In addition, a medical organizer case may only include a single chamber for containing a prescription bottle storage unit.

Figure 15:
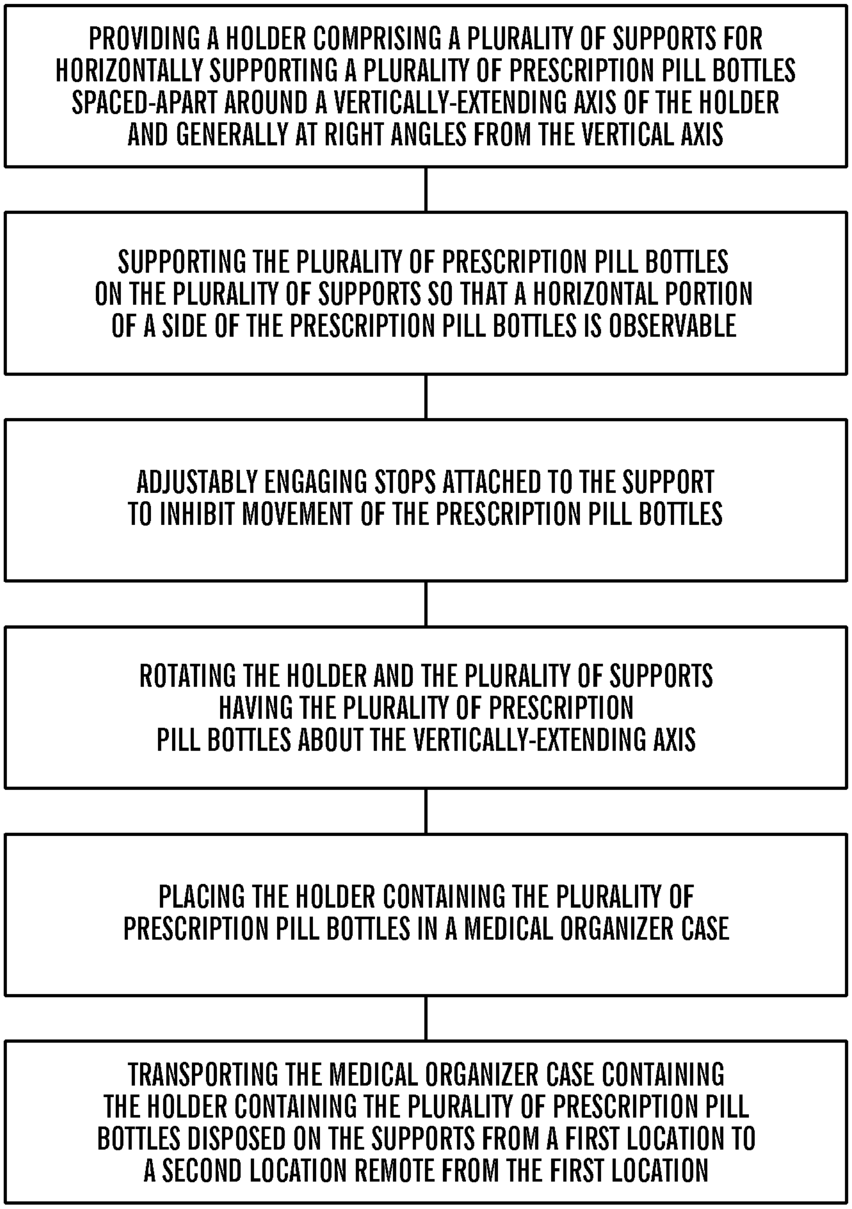
FIG. 15 is a flowchart of one embodiment of a process for organizing a plurality of prescription pill bottles in accordance with an aspect of the present invention.

FIG. 15 illustrates one embodiment of a method for organizing a plurality of prescription pill bottles in accordance with an aspect of the present invention.

From the present description, it will be appreciated that if a person is unconscious, or in any other way incapacitated, to relay information to an emergency room doctor about his/her doctor's names, medicines he/she is on, past medical history etc., the storage unit/case of the present invention will help medical personnel to assist the patient, even if family members are present and do not know the information themselves. Also, storage unit/case of the present invention provides all the information for medical personnel especially when it is difficult to relay information under stressful situations, such as an emergency room visit, when time was of the essence.

The storage unit/case/binder allows family members to stay with the patient and need not answer questions from doctors/nurses, because the doctors and/or medical personnel can go through the unit and binder independently to extract relevant medical information.

If medical personnel go to a home where a person lives alone, or if family members are not present to assist in relaying medical information, the storage unit/case/binder would have all the vital information in it. The medical binder in side compartment 350 may also contain business cards with phone and fax numbers of all doctors, medical history, medication lists, emergency family contact phone numbers, living will, power of attorney, DNR's etc.

The case can be locked or stored in a locked area with medications to reduce the misuse/accidental ingestion of medicines by young children and/or theft of the medication by older children.

Thus, while various embodiments of the present invention have been illustrated and described, it will be appreciated to those skilled in the art that many changes and modifications may be made thereunto without departing from the spirit and scope of the invention.

The invention claimed is:

1. A portable prescription bottle storage unit for individually holding a plurality of differently sized prescription pill bottles, the prescription bottle storage unit comprising:

a holder comprising:

a plurality of vertically-extending planar sides operably connected and disposed around and spaced at right angles from a vertically-extending axis defining a chamber for storage of removable items therein having an openable member for accessing said chamber;

a plurality of supports operably attached to said plurality of vertically-extending planar sides and spaced apart around said vertically-extending axis;

each of said plurality of supports comprising a substantially semi circular shape;

each of said plurality of supports sized and configured for individually receiving and supporting any one of the different sized prescription pill bottles outside said chamber along outer surfaces of said plurality of vertically-extending planar sides;

each of said plurality of supports comprising an adjustable biasing restraint and at least one stop operable to releasably and biasly engage an individual one of any of the different sized prescription pill bottles and fixedly restrain the individual prescription pill bottle and inhibit movement of the prescription pill bottle along a longitudinal length of said support so that a label identifying the prescription of the prescription pill bottle is observable; and means for rotatably supporting said holder on a table or a counter so that said holder and the plurality of differently sized prescription pill bottles being rotatable around said vertically-extending axis.

2. The prescription bottle storage unit of claim 1 wherein said plurality of supports is configured to support the plurality of differently sized prescription pill bottles with a center portion of a length of the prescription pill bottle being disposed generally at right angles to said vertically-extending axis.

3. The prescription bottle storage unit of claim 1 wherein said plurality of supports is configured to allow the plurality of differently sized prescription pill bottles to move upwardly during placement and removal.

4. The prescription bottle storage unit of claim 1 wherein said adjustable biasing restraint adjustably engages an end of the prescription pill bottle.

5. The prescription bottle storage unit of claim 1 wherein said holder comprises a movable drawer therein.

6. The prescription bottle storage unit of claim 1 wherein said holder further comprises a handle disposed along an upper portion of the prescription bottle storage unit for lifting said prescription bottle storage unit.

7. The prescription bottle storage unit of claim 1 further comprising a medical organizer case comprising a compartment for receiving said prescription bottle storage unit therein.

8. The prescription bottle storage unit of claim 7 wherein said medical organizer case further comprises at least one side compartment.

9. The prescription bottle storage unit of claim 7 wherein said medical organizer case further comprises a first side compartment and a second side compartment, and further comprising a binder receivable in at least one of said first side compartment and said second side compartment.

10. The prescription bottle storage unit of claim 7 wherein said medical organizer case further comprises a front compartment.

11. The prescription bottle storage unit of claim 7 wherein said medical organizer case is fabricated from a fabric material.

12. The prescription bottle storage unit of claim 7 wherein said medical organizer case further comprises at least one of a handle and a strap for lifting said medical organizer case.

13. The prescription bottle storage unit of claim 7 wherein said removable prescription bottle storage unit is operable to horizontally support the prescription pill bottles around said vertically-extending axis.

14. The prescription bottle storage unit of claim 7 wherein said compartment is sized and configured to tightly surround the plurality of supported spaced-apart prescription pill bottles.

15. The prescription bottle storage unit of claim 14 wherein said medical organizer case further comprises at least one side compartment.

16. The prescription bottle storage unit of claim 7 wherein said medical organizer case further comprises a first side compartment and a second side compartment, and further comprising a binder receivable in at least one of said first side compartment and said second side compartment.

17. The prescription bottle storage unit of claim 16 wherein said medical organizer case further comprises a front compartment.

18. The prescription bottle storage unit of claim 16 wherein said medical organizer case is fabricated from a fabric material.

19. The prescription bottle storage unit of claim 16 wherein said medical organizer case further comprises at least one of a handle and a strap for lifting said medical organizer case.

20. A method for organizing a plurality of prescription pill bottles, the method comprising:

providing the prescription bottle storage unit of claim 1;

individually supporting the plurality of spaced-apart differently sized prescription pill bottles on the supports of the holder around the vertically-extending axis so that labels identifying the prescriptions of the plurality of differently sized prescription pill bottles are observable.

21. The method of claim 20 further comprising rotating the plurality of spaced-apart differently sized prescription pill bottles about the vertically-extending axis.

22. The method of claim 20 wherein the supporting comprises supporting the plurality of spaced-apart differently sized prescription pill bottles horizontally.

23. The method of claim 20 further comprising adjustably engaging the adjustable biasing restraint to inhibit movement of the prescription pill bottles.

24. The method of claim 20 further comprising cooling the chamber surrounded by the plurality of spaced-apart differently sized prescription pill bottles.

25. The method of claim 20 further comprising accessing the chamber.

26. The method of claim 20 further comprising storing at least one of a weekly pill dispenser and a monthly pill dispenser adjacent to the plurality of spaced-apart differently sized prescription pill bottles.

27. The method of claim 20 further comprising transporting the plurality of supported spaced-apart differently sized prescription pill bottles from a first location to a second location remote from the first location.

28. The method of claim 20 further comprising placing the plurality of supported spaced-apart differently sized prescription pill bottles in a medical organizer case.

29. The method of claim 28 wherein the medical organizer case comprises a compartment sized and configured for tightly receiving the plurality of supported spaced-apart differently sized prescription pill bottles.

30. The method of claim 28 wherein the medical organizer case further comprises at least one side compartment, and further comprising a binder receivable in said at least one side compartment.

31. The method of claim 28 further comprising transporting the medical organizer case containing the plurality of supported spaced-apart differently sized prescription pill bottles from a first location to a second location remote from the first location.

32. The prescription bottle storage unit of claim 1 further comprising a lock for locking said openable member and unlocking said openable member to access the chamber.

33. The prescription bottle storage unit of claim 1 wherein said plurality of supports comprises a plurality of elastic bands.

34. The prescription bottle storage unit of claim 7 wherein said supports comprises a plurality of elastic bands.

* * * * *